April 22, 1930.  J. H. WILSON  1,755,528
COMBINATION FLATIRON AND STAND
Filed May 2, 1927
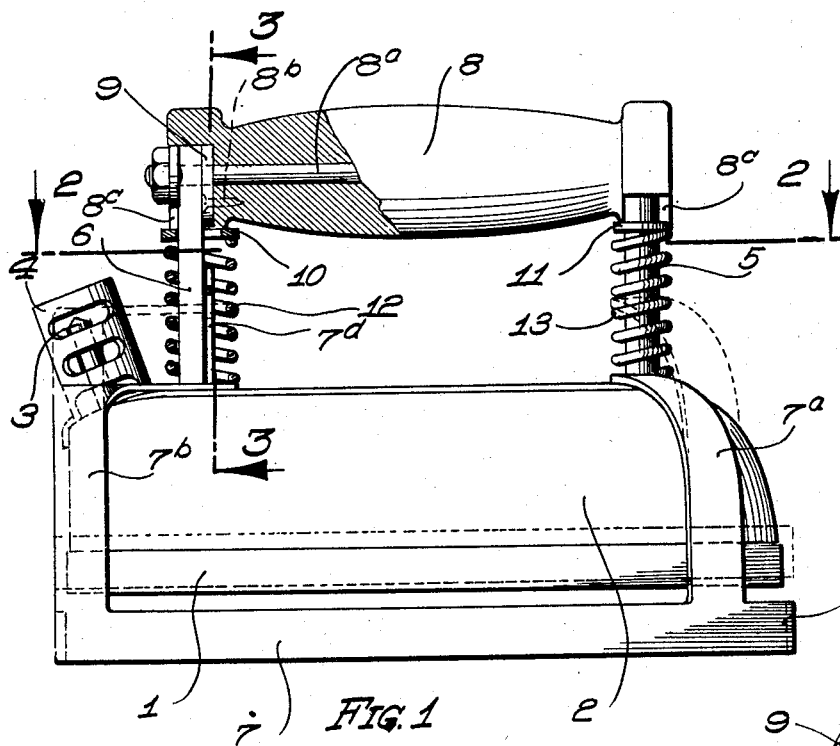
Fig. 1
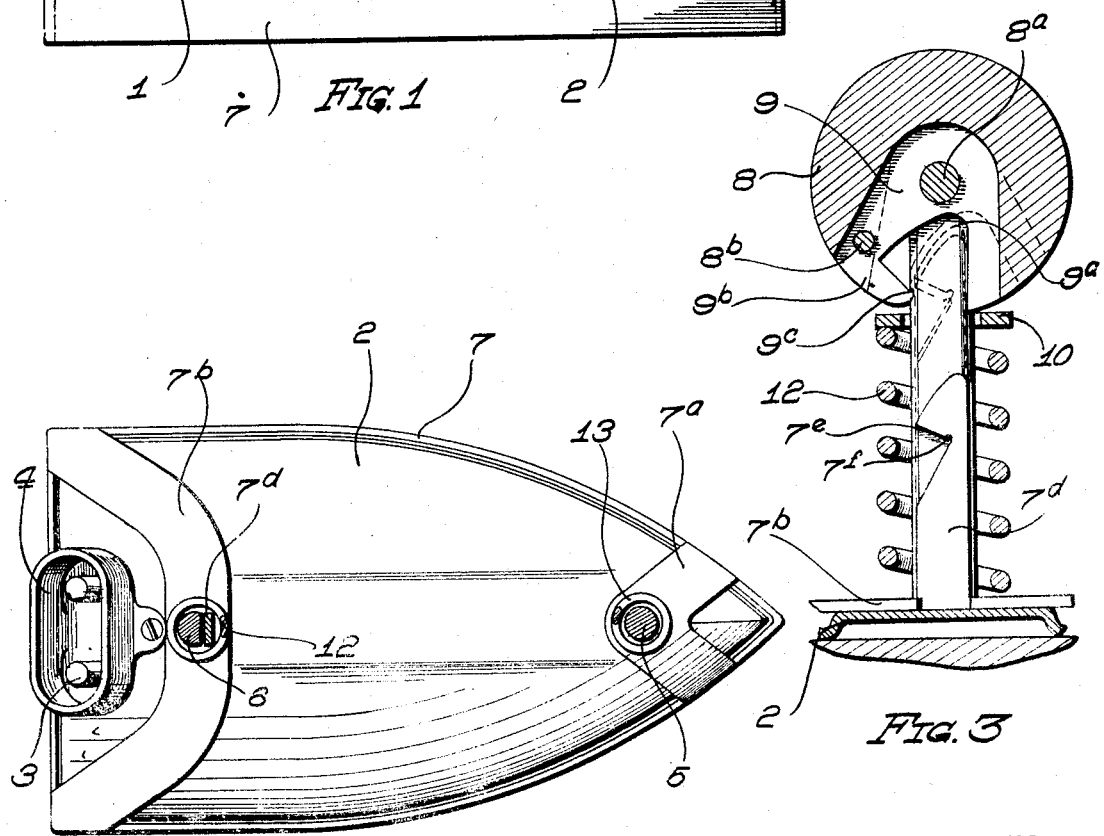
Fig. 2
Fig. 3
INVENTOR.
JOHN H. WILSON
BY A. B. Bowman
ATTORNEY Patented Apr. 22, 1930

1,755,528

UNITED STATES PATENT OFFICE

JOHN H. WILSON, OF SAN DIEGO, CALIFORNIA

COMBINATION FLATIRON AND STAND

Application filed May 2, 1927. Serial No. 188,231.

My invention relates to flat iron stands, more particularly to electric flat iron stands, and the objects of my invention are: First, to provide a device of this class which automatically supports the flat iron off of its bottom; second, to provide a device of this class which can be adapted for the different makes and types of flat irons; third, to provide a device of this class which requires only a slight turn of the handle to place the stand in position for use, and a downward pressure upon the handle and a slight turn thereof to lock the stand in an out-of-the-way position for ironing; fourth, to provide a device of this class which is a very safe rest for irons, the points of support all being outside of the base of the iron; fifth, to provide a device of this class which is always in position on the iron; and sixth, to provide a device of this class which is simple of construction, durable, neat in appearance, efficient in its action, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of an electric flat iron with my stand positioned thereon, with parts and portions broken away and in section to facilitate the illustration; Fig. 2 is a top or plan sectional view thereof, through 2—2 of Fig. 1; and Fig. 3 is a fragmentary sectional view thereof, through 3—3 of Fig. 1.

Similar characters of reference refer to similar parts and portions throughout the several views of the drawings.

The flat iron base plate 1, casing 2, terminal 3, terminal protector 4, handle support members 5 and 6, flat iron stand member 7, handle 8, catch plate member 9, washers 10 and 11, and springs 12 and 13, constitute the principal parts and portions of my combination flat iron and stand.

The flat iron base plate 1, heating element and upper plate and casing 2, terminal 3 and terminal protector member 4, are all similar to the conventional electric flat iron. Two handle support members 5 and 6 are provided, which extend through the casing 2 and into the upper plate. Each handle support member 5 and 6 extends perpendicularly to the base plate 1 and has slidably mounted upon it, the flat iron stand supports $7^a$ and $7^b$, respectively. The stand support $7^a$, which is mounted on the forward handle support 5, is preferably made of medium gage metal, and extends outwardly and forwardly, then downwardly, to an iron stand 7. The iron stand 7 is made of similar material to the iron stand supports $7^a$ and $7^b$ and is substantially the shape of the base plate, and slightly spaced apart therefrom. The stand support $7^a$ meets the iron stand 7 at points on either side of, and near the toe of the iron stand. The stand support $7^b$, which is mounted on the handle support 6, extends outwardly, rearwardly, then downwardly therefrom, and joins the iron stand 7 at the two rear or heel corners. The downwardly extending portions of the stand support $7^b$ are considerably longer than the height of the body of the iron and angular, one leg joining the side portion of the iron stand and the other leg joining the rear or heel portion of the iron stand, thereby forming a rigid support. Just forward of the rear handle support 6, a portion of the rear iron stand support is bent upwardly parallel to the handle support 6 and adjacent to a flat portion at the front side thereof, forming a catch portion $7^d$. This catch portion $7^d$ is, as shown best in Fig. 3 of the drawings, provided with a notch in one side thereof forming a downwardly inclined surface $7^e$. The handle 8 is provided with a central hole, through which extends a bolt $8^a$, which also passes through the handle support members 5 and 6 and secures them to the handle 8. On each end of the handle 8 are provided notches $8^c$, which permit a slight turn of the handle in relation to the support members.

On the front side of the handle support 6 is a catch plate 9, which is secured to the handle by means of the bolts 8ª and a small screw 8ᵇ. The catch plate 9 is substantially U-shaped with the sides diverging outwardly from each other and downwardly to the outer periphery of the handle 8. The lower edge of the catch plate forms a substantially angular slot 9ª with a lug 9ᵇ extending inwardly from one side thereof. When the iron is pressed down so as to rest on the same surface as the stand 7 the lug 9ᵇ is adapted to register with the outer end of the inclined surface 7ᵉ of the iron support member 7ᵈ. Just under the rear end of the handle 8 is a washer 10, which surrounds the handle support 6, and leaves space enough for the operation of the catch 7ᵈ. A similar washer 11 is positioned around the handle support 5 and adjacent to the handle 8. Between the washer 10 and the iron stand support 7ᵇ is a spring 12, which surrounds the handle support 6 and the catch member 7ᵈ. A similar spring 13 is positioned between the washer 11 and the iron stand support 7ª and around the handle support 5.

The action of the iron stand is as follows:

When the iron is not in use, the springs 12 and 13 press the handle and rest supports from each other, thereby holding the base of the iron in an elevated position in relation to the iron stand 7. When the iron is desired for use, the iron is pressed down until it is resting on the same surface as the iron stand 7, and the catch 7ᵈ is then in the position shown by the lower set of dotted lines in Fig. 3 of the drawings namely registering with the outer end of the inclined surface 7ᵉ. The handle is then turned slightly. As the surface 7ᵉ is inclined downwardly, engagement by the lug 9ᶜ causes an upward movement of the catch member 7ᵈ, which lifts the rest slightly above the base of the iron as the handle is turned and prevents the interference of the iron stand when the iron is used for ironing, as shown by the second or upper set of dotted lines in Figs. 1 and 3 of the drawings. A slight notch 7ᶠ within the surface 7ᵉ and a protuberance 9ᵉ at the upper outer extremity of the lug 9ᵇ may be provided, which interlock and hold the iron support from accidental release. To place the iron in the rest position, the handle 8 is turned, and the action of the springs raises the iron.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a device of the class described, an electric flatiron body, handle supports on said iron body, a rotatably mounted handle supported between said supports, said handle having catch means rotatable therewith, a stand for said iron slidably mounted on said handle supports, said stand having a foot portion encircling the base of said iron body and conforming to the shape thereof, resilient means adapted to hold said stand in extended position from said handle, and catch means on said stand adapted to be engaged by said handle catch means by rotation of said handle when the stand is moved into retracted position relative to said iron body.

2. In a device of the class described, an electric flatiron having a rotatably mounted handle, a shiftable support, including a foot portion encircling the base of said iron and shiftable relative to said iron, and means for normally supporting the iron above said foot portion, means for securing said shiftable support in raised position relative to the base of said iron, said securing means being operable by rotation of said handle.

3. In a device of the class described, an electric flatiron having a base portion, a handle supported thereon and movable relative thereto, a support, including a foot portion encircling the base of said iron and shiftable relative to said iron, means for normally supporting the iron above the foot portion of said support, means for securing said shiftable support in raised position relative to the base of said iron, said securing means being operable by movement of said handle.

4. In a device of the class described, an electric flatiron body, handle support means secured to said body, a handle rotatably mounted on said supports, a stand for said iron body having a foot portion encircling the base of said iron body in spaced relation therewith, a pair of yoke members secured to said foot portion and straddling the front and rear portions of said iron body, said yokes being slidably mounted on said handle support means and allowing reciprocal movement of said stand relative to said iron body, resilient means for holding said stand in extended position, and raising said iron body above said foot portion, an upwardly extending catch member secured to one of said yokes and a catch member secured to said handle, said catch members being mutually engageable on rotation of said handle when said stand is retracted to a position in which the bases of said iron body and stand lie in a common plane, said catch members having means to cause a further retraction of said stand and to lock said stand in said latter position.

5. In a device of the class described, a flatiron body, spaced apart, upright handle supports on said iron body, a rod extending between the upper ends of said supports, a handle mounted on said rod and rotatable thereon, means for limiting the rotation of said handle, a downwardly extending hook-shaped catch member secured to said handle and rotatable therewith, a stand for said iron slidably mounted on said handle supports, said stand including a base portion encircling the base of said iron body and yoke portions straddling the front and rear end portions thereof, helical springs positioned around said handle supports between said handle and said yoke portions forcing said stand into extended position relative to said handle, an upwardly extending catch member secured to said stand and having a downwardly inclined engaging surface, said first catch member adapted to register with the outer edge of said inclined surface when said iron and stand occupy a common surface and to raise said stand above said common surface when said first catch member is rotated into engagement with said inclined surface.

In testimony whereof, I have hereunto set my hand at El Centro, California, this 20th day of April, 1927.

JOHN H. WILSON.